United States Patent [19]
Tai

[11] Patent Number: 5,133,860
[45] Date of Patent: Jul. 28, 1992

[54] SOLID AND LIQUID SEPARATOR WITH A LIQUID FILTER

[76] Inventor: Liang C. Tai, No. 8, Min-Sheng Lane, Hsing Shu Rd., Pai Shu Village, Chiao Tou Hsiang, Kaohsiung Hsien, Taiwan

[21] Appl. No.: 814,833

[22] Filed: Dec. 31, 1991

[51] Int. Cl.⁵ .............................................. B01D 33/42
[52] U.S. Cl. .................................. 210/256; 210/262; 210/266; 210/290; 210/297; 210/403; 210/411; 210/456
[58] Field of Search .............. 210/256, 262, 266, 267, 210/275, 290, 297, 403, 411, 456

[56] References Cited
U.S. PATENT DOCUMENTS

| | | | |
|---|---|---|---|
| 980,463 | 1/1911 | Welcome | 210/266 |
| 1,054,323 | 2/1913 | Steele | 210/403 |
| 3,285,416 | 11/1966 | Eltenton | 210/456 |

Primary Examiner—Ivars Cintins
Attorney, Agent, or Firm—Fleit, Jacobson, Cohn, Price, Holman & Stern

[57] ABSTRACT

A solid and liquid separator with a liquid filter, having an inner cylinder and an outer cylinder combined together to rotate synchronously to let solids naturally separate from liquid, and a filter for the separated liquid to be further filtered and the separated solids to be collected together away.

1 Claim, 2 Drawing Sheets

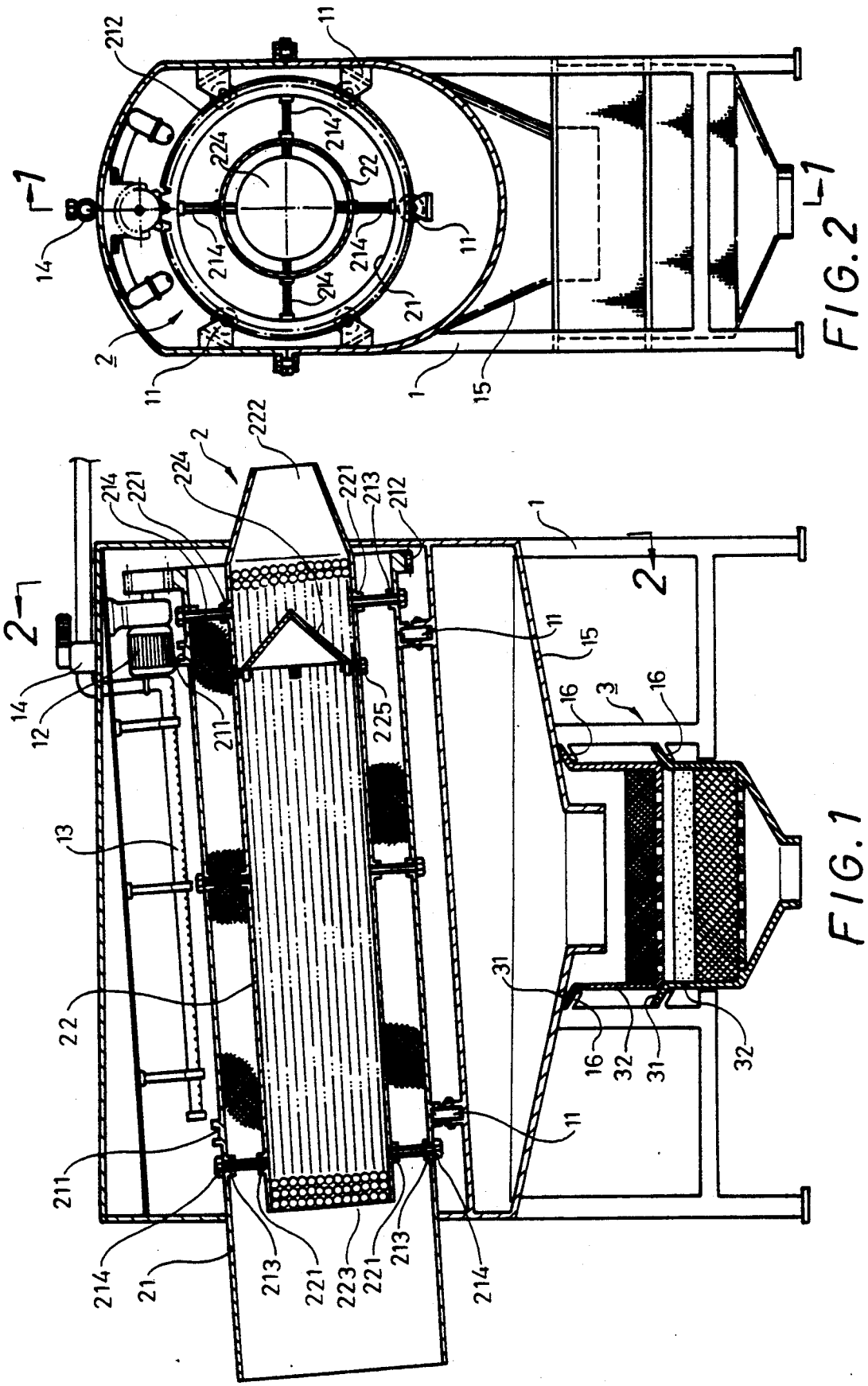

SOLID AND LIQUID SEPARATOR WITH A LIQUID FILTER

BACKGROUND OF THE INVENTION

A conventional simple solid and liquid separator with a liquid filter comprises a motor to suck in a vaccum fashion liquid mixed with solids into a separator provided with a buffer plate to slow the speed of the liquid with solids, and an inclined net plate for the liquid to drop down through net holes in the plate.

Another conventional solid and liquid separator comprises a tube having net holes in the wall and a worm gear rod in its interior to push the coming-in liquid mixed with solids, letting liquid to drop through the holes and solids to be pushed forward.

However, the conventional separators mentioned above have problems of solids blocking the filter net, liquid impossible to pass through the net, or necessary washing of the net, to a resultant bad function.

SUMMARY OF THE INVENTION

This solid and liquid separator with a liquid filter has been devised to comprise a rotatable inclined separator consisting of an outer cylinder and an inner cylinder fixed in the outer cylinder to rotate synchroneously by means of a motor, letting coming-in liquid to drop down through net holes on the walls of both cylinders into a filter but solids to move gradually down along the wall of the inner cylinder to drop down in the outer cylinder to be collected away.

BRIEF DESCRIPTION OF DRAWINGS

FIG. 1 is a cross-sectional view of line 1—1 in FIG. 2.

FIG. 2 is a cross-sectional view of line 2—2 in FIG. 1.

DETAILED DESCRIPTION OF THE INVENTION

Figure 3:
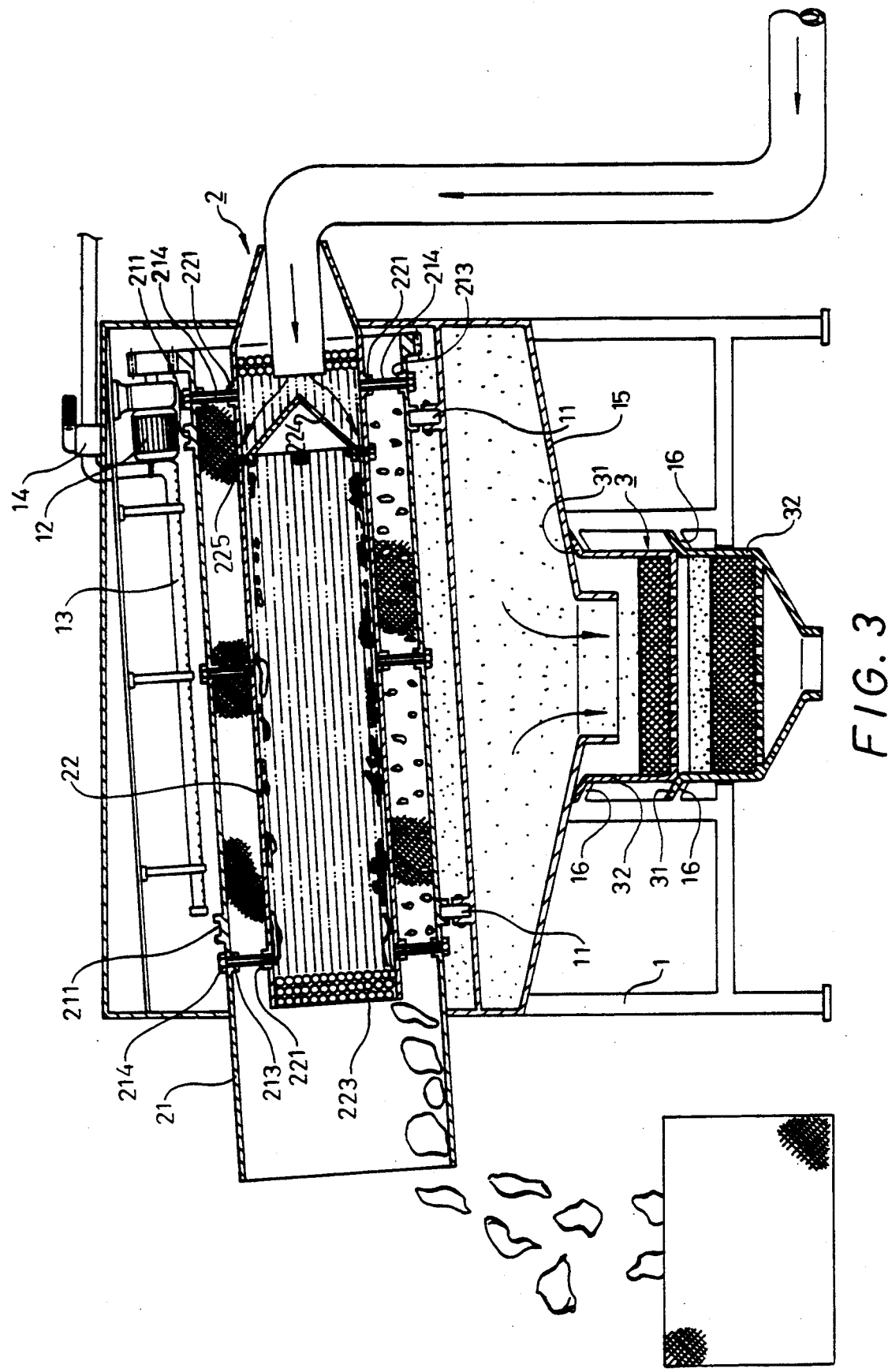
FIG. 3 is a cross-sectional view of the solid and liquid separator with a liquid filter in the present invention.

The solid and liquid separator with a liquid filter in the present invention, as shown in FIGS. 1, 2, comprises a frame 1, a separator 2, and a liquid filter 3 as the main components.

The frame 1 has rollers 11 to support the separator 2, a motor 12 to rotate the separator 2, a spray tube 13 combined with a valve 14 at the upper protion to spray water to wash an outer cylinder 21 in the separator 2, and an inclined guide plate 15 at the lower portion to guide water to flow in the liquid filter 3 under the guide plate 15. The separator 2 consists of an outer cylinder 21 and an inner cylinder 22 both fixed inclined. The outer cylinder 21 is made of a net material, having a U-shaped annular rails 211 on the outer surface for the rollers 11 in the frame 1 to fit in and to be supported by the frame so as to enable the cylinder 21 to rotate by combination of the rails 211 and the rollers 11. The outer cylinder 21 also has annular teeth 212 on the right end to engage with a gear wheel on the shaft of the motor 12, which thus rotates the cylinder 21, and threaded holes 213 for bolts 214 to screw through to screw with threaded holes 221 of the inner cylinder 22 to combine the outer cylinder 21 with the inner cylinder 22.

The inner cylinder 22 is also made of a net material, having threaded holes 221 for the bolts 214 to screw with, an inlet 222 at the right vertical end higher than the left vertical end formed as an outlet 223 for solids, which then falls down in the outer cylinder 21. A buffer plate 224 is provided in the inner cylinder 22 near the right end, a little separated from the wall of the inner cylinder 22 and fixed firmly with bolts 225. When liquid mixed with solids enters through the inlet 222, it will be temporarily stopped by the buffer plate 224 to slow down, and then solids gradually passes through the space between the plate 224 and the cylinder wall and slowly moves down to the left end to fall out of the outlet 223, but liquid will fall down through net holes in the cylinder wall.

The liquid filter 3 is positioned under the guide plate 15 to receive the liquid coming out of the outer cylinder 21, having filtering layers of gravel, sand, charcoal, net, etc. depending on necessity in filtering process. The filler materials can be displaced with new ones after a period of use. The liquid filter 3 has a tank 32 in which layers of filter materials are deposited. The tank 32 has holes in the bottom for filtered liquid to flow down and a flange 31 at the top to engage with a projecting edge 16 in the guide plate 15 to be positioned stabilized under the plate 15.

FIG. 3 shows how this solid and liquid separator is operated. The inclined separator 2 is slowly rotated by the motor 12, and the liquid mixed with solid to be separated from each other is poured through the inlet 222 into the inner cylinder 22, allowing the liquid directly fall down through the net holes in the inner cylinder 22 and then into the outer cylinder 21, and letting the solids move gradually down along the inclined wall of the inner cylinder 22. As the outer and the inner cylinder rotate at the same time, the separated solids cannot block the walls of both cylinders, surely moves down along the wall of the inner cylinder. If necessary, water con rolled by the valve 14 can be sprayed out of the tube 13 on the outer cylinder to wash off miscellaneous solids stuck in net holes in the cylinder wall.

What is claimed is:

1. A solid and liquid separator with a liquid filter comprising;

a frame having rollers fitting in U-shaped annular rails on an outer cylinder in a separator, a motor to rotate the separator, a spray tube provided lengthwise above the separator, a valve combined with the spray tube to control the volume of the water to flow out of said tube, and an inclined guide plate in the lower portion below the separator to receive and guide the water coming out of the separator to flow down in a liquid filter;

a separator consisting of an outer cylinder, an inner cylinder positioned in the outer cylinder, both cylinders made of net material and positioned inclined and supported by the frame, said outer cylinder provided with U-shaped annular guide rails on its outer surface to fit with the rollers in the frame so that said outer cylinder can rotate driven by said motor, said outer cylinder also provided with threaded holes in the wall for bolts to screw through to screw with threaded holes in the inner cylinder so that said two cylinders are combined firmly together to rotate synchroneously, said inner cylinder provided with a buffer plate fixed with screws near an inlet in the right vertical end and a little separated from the cylinder wall, said inlet positioned higher than an outlet in the left vertical end to enable the liquid mixed with solids move down in said inner cylinder;

a liquid filter having a tank containing layers of filter materials to filter the liquid dropping down from the guide plate, said tank provided with a flange at the top to engage with a projecting edge in the guide plate to be kept in position; and said separator receiving liquid mixed solids through said inlet in said inner cylinder, said inner cylinder and said outer cylinder being rotated by said motor to let liquid first fall down through net holes in the cylinder wall and solids coming in said inner cylinder to move gradually down the inclined cylinder wall and finally dropping through said outlet down in said outer cylinder, and the liquid further flowing down on said guide plate and then in said filter for filtering.

* * * * *